J. M. WHITE.
SAW FOR REMOVING STUMPS.
APPLICATION FILED JAN. 31, 1908.
901,505.
Patented Oct. 20, 1908.
2 SHEETS—SHEET 1.
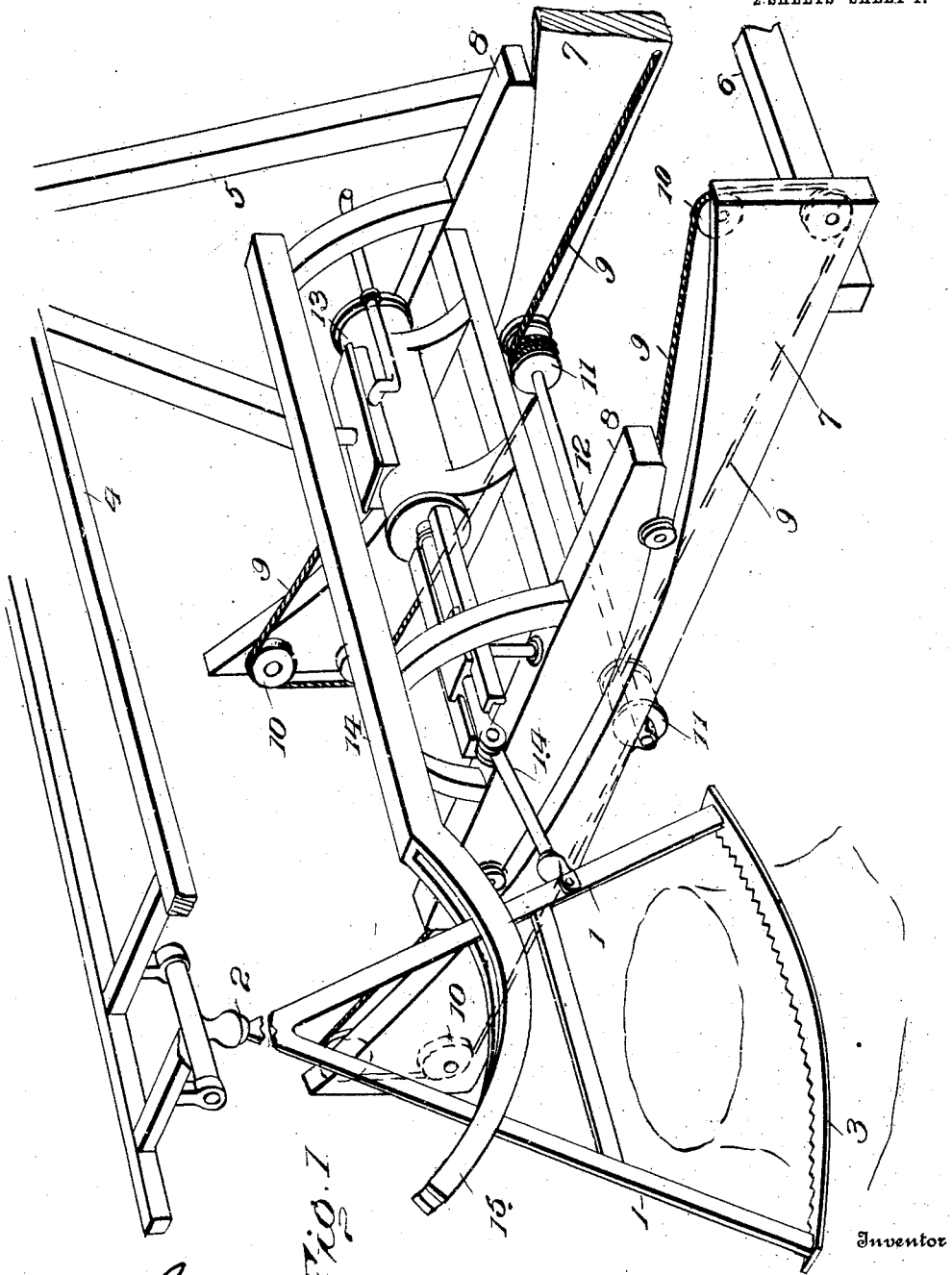

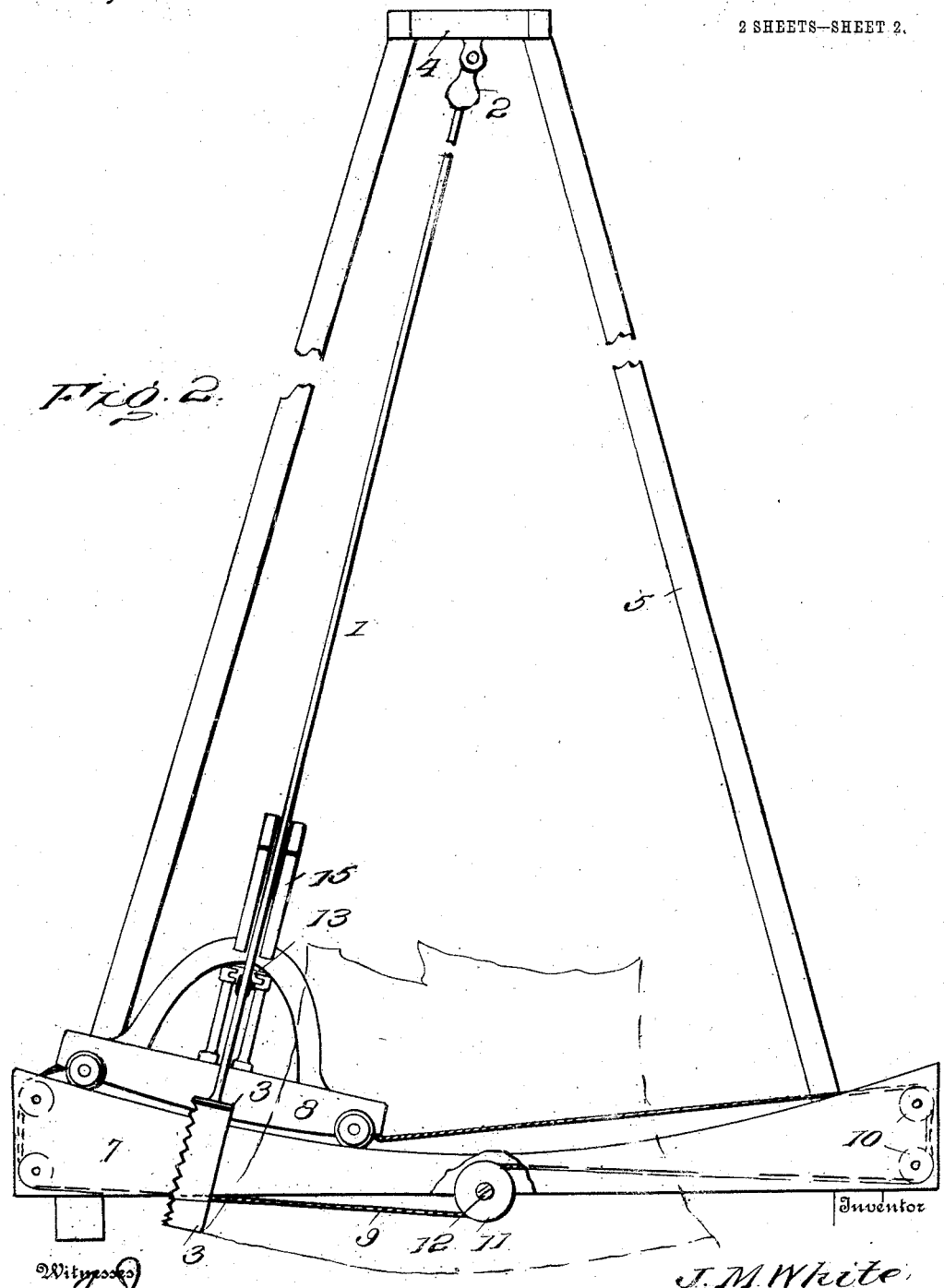

UNITED STATES PATENT OFFICE.

JOHN M. WHITE, OF SELMA, OREGON.

SAW FOR REMOVING STUMPS.

No. 901,505.

Specification of Letters Patent.

Patented Oct. 20, 1908.

Application filed January 31, 1908. Serial No. 413,582.

*To all whom it may concern:*

Be it known that I, JOHN M. WHITE, citizen of the United States, residing at Selma, in the county of Josephine and State of Oregon, have invented certain new and useful Improvements in Saws for Removing Stumps, of which the following is a specification.

The present invention has relation to means for clearing land and more particularly to devices for removing stumps of trees, by cutting off the portion projecting above the soil in contradistinction to means for extracting the stump and roots.

The present invention provides a saw which will cut the stump below the surface of the ground without the latter interfering with the operation of the saw blade, the cut resulting in the end of the stump removed having a rounded appearance, and the end remaining in the soil presenting a cup-shaped form.

In accordance with this invention a frame is mounted to swing about a given center and is provided with a curved saw blade formed on the arc of a circle having its center coincident with the point of suspension of said frame.

The invention also consists of means for imparting an oscillatory movement to the saw frame, for guiding the same in its oscillatory movements and means for positively feeding the saw as the work progresses.

For a full understanding of the invention and the merits thereof and also to acquire a knowledge of the details of construction, and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a sawing machine specially designed for removing stumps and embodying the essence of the invention. Fig. 2 is a front view of the machine.

Corresponding and like parts are referred to in the following description and indicated in all the views of the drawings by the same reference characters.

The saw frame 1 is suspended at 2, by means of a universal joint to admit of the frame moving freely in all directions about a given point. A saw blade 3 is attached in any convenient and substantial manner to the lower end of the saw frame and is curved throughout its length on the arc of a circle whose center coincides with the point 2 from which the saw frame is suspended. A suitable framework 4 supports the saw frame and comprises an upright portion 5 and an overhanging portion to which the saw frame is directly connected by the point 2. A base 6 is provided with ways 7 which are curved and support a carriage 8 to which the upright portion 5 of the saw carrying frame is rigidly connected. The carriage 8 is adapted to travel in the arc of a circle having its center coincident with the point of suspension 2 of the saw frame, thereby preventing any binding of the saw blade in the operation of the machine. Movement of the carriage 8 in one direction feeds the saw and movement of the carriage in the opposite direction returns the saw to a normal position ready for the next cut. The carriage may be advanced and returned to a given position by any mechanism, such as commonly employed for operating saw mill carriages. As shown, operating cords or like connections 9 pass around guide pulleys 10 at the ends of the ways 7 and have their ends connected to drums 11 fast to a shaft 12 which is adapted to be alternately driven in opposite directions in any well known manner, so as to wind and unwind the ropes or connections 9 and effect a reciprocating movement of the carriage 8 on the ways 7. The saw frame 1 may be oscillated in any manner, preferably by means mounted upon the carriage 8. In the present instance, an engine 13 mounted upon the carriage 8 and movable therewith, is connected by pitman 14 with a side bar of the frame. The engine is of the reciprocating type. To properly direct the saw frame in its oscillatory movements, a guide is provided and consists of a bar 14 having a curved fork 15, the latter being curved on the arc of a circle having its center coincident with a point of suspension or oscillation of the saw frame. The bar 14 is connected to the carriage so as to move therewith, and the fork 15 projects from said carriage to engage with the saw frame and give proper direction thereto.

When positioning the machine to remove a stump, it is arranged so that the point of suspension 2 of the saw frame is about in line with the center of the stump so that a perpendicular line passed through the center of oscillation of the saw frame will also pass through the center of the stump. As a result of this arrangement, the saw at the beginning of the cut will enter the stump at a point corresponding approximately to the surface of the ground and will gradually descend until the center of the same is reached, when it will gradually rise and emerge from the opposite side of the stump about in the plane of the surface of the ground. The end of the stump removed will be convex or spheroidal in form, whereas the end of the stump remaining in the ground will be concave or of cup-form, and being below the surface will soon rot.

The saw frame is braced to provide a substantial structure and avoid the necessity of a heavy and cumbersome joint at the point of convergence of the side members thereof. The saw blade 3 is arranged about at a right angle to the plane of movement of the saw frame and is made unusually thick and comparatively narrow so as to maintain the curved form and to operate freely in the kerf. It is proposed to operate the machine in land free from stones and grit. By vertically adjusting the structure, the saw may be regulated to cut the roots of the stump and to thereby obviate the necessity of cutting through the body of the stump.

Having thus described the invention, what is claimed as new is:

1. In a machine of the character specified, a saw blade formed on the arc of a circle and suspended by means of a universal joint so as to oscillate and move laterally to the plane of oscillation, whereby the saw advances to its work on a curved line corresponding with the curvature of the saw blade, the point of suspension of the saw coinciding with the center of movement thereof in every direction.

2. In a machine of the character specified, the combination of a saw frame provided with an arc-shaped saw, and suspended from a point coinciding with the center of the circle from which the saw blade is struck, a carriage, curved ways for said carriage, means mounted upon the carriage for imparting an oscillatory movement to the saw frame, a guide projected from the carriage to direct the saw frame in its oscillatory movements, and means for moving the carriage on a curved plane corresponding with the path of movement of the said saw blade.

3. In combination, a saw frame suspended by means of a universal joint, curved ways, a carriage mounted to reciprocate upon said curved ways, means mounted upon the carriage for imparting an oscillatory movement to the saw frame, and a guide carried by said carriage and adapted to direct the saw frame in its movement.

In testimony whereof I affix my signature in presence of two witnesses.

JOHN M. WHITE. [L. S.]

Witnesses:
ROBERT C. CHURCHILL,
ERNEST MASTIN.